G. G. SMITH.
PROCESS OF EXTRACTING HOPS.
APPLICATION FILED JUNE 19, 1908.
992,275.
Patented May 16, 1911.
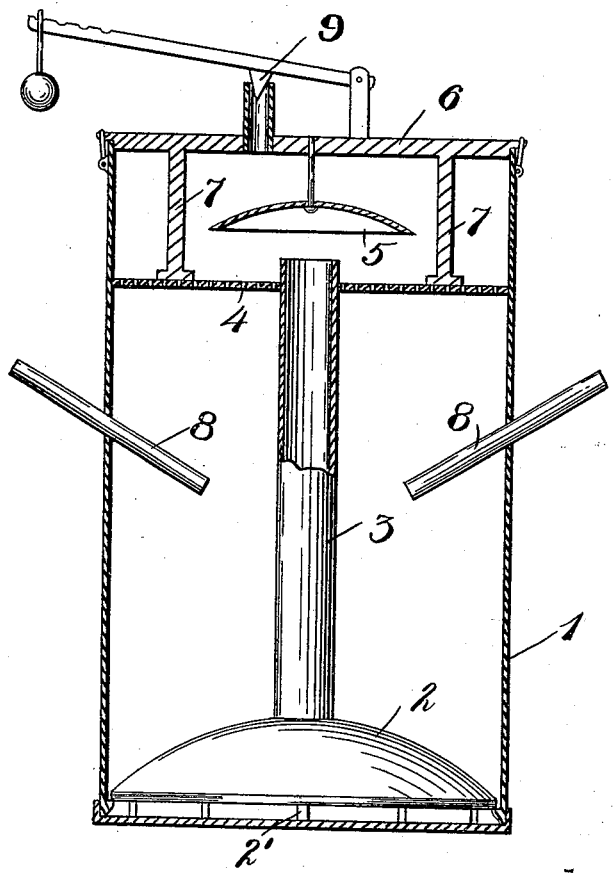
Witnesses:
Inventor
G. G. Smith
By his Attorneys

UNITED STATES PATENT OFFICE.

GEORGE GREGORY SMITH, OF ST. ALBANS, VERMONT.

PROCESS OF EXTRACTING HOPS.

992,275.  Specification of Letters Patent.  Patented May 16, 1911.

Application filed June 19, 1908. Serial No. 439,336.

*To all whom it may concern:*

Be it known that I, GEORGE GREGORY SMITH, a citizen of the United States, residing at St. Albans, county of Franklin, State of Vermont, have invented certain new and useful Improvements in Processes of Extracting Hops, of which the following is a full, clear, and exact description.

My invention relates to an improved process of extracting from hops the substances used in the manufacture of beer, and particularly contemplates a process by which that content alone of the hops necessary to the successful manufacture of beer may be readily segregated and prepared for use in the most effective, and at the same time, economical manner.

A further object of the invention is to provide a process whereby the several desired constituents of the hops may be fractionated to vary the character of the extract in order to adapt it to the making of beers of different qualities.

In its broadest aspect, the invention consists in the aqueous extraction and segregation of those properties of the hops employed in the manufacture of beer, by digesting the hops in a sealed boiler at a given temperature and for an ascertained time, and the subsequent cooling and evaporation of the water of digestion under a given maximum temperature.

For clearer comprehension of the process constituting my invention, I have illustrated, in a conventional way, part of the apparatus employed therein which is shown in the accompanying drawing, in which the figure is a vertical section of the apparatus.

The form of apparatus here selected for illustration comprises a cylindrical vessel 1 of copper or enameled iron. It is to be understood that no iron should come in contact with the hops.

2 is a dome-shaped plate preferably of copper, located at the bottom of the vessel to form a heating chamber at the base, and having openings 2′ around its perimeter for a purpose hereinafter described. A pipe 3 extends vertically therefrom to the upper portion of the vessel 1 and leads through and projects above a perforated copper plate 4, which forms a cover for the hops.

5 is a baffle plate of substantially mushroom form for distributing the water of distillation from the pipe 3 over the perforated plate 4, through which the water percolates through the body of the hops, which is contained between the plates 2 and 4.

A steam-tight cover 6 is provided for the vessel 1, having projections 7 which extend down to and in contact with the plate 4, to hold the latter firmly down upon the hops during the boiling operation. Thermometers 8 extend through the sides of the vessel 1 into the hop-containing portion thereof between the plates 2 and 4. A safety valve 9 is also mounted upon the cover 6, by which the pressure within the vessel 1 may be regulated and controlled.

In carrying out my improved process, the entire hops, that is to say, without previous segregation of the lupulin, are placed within the vessel 1 upon the plate 2, and are submitted to a soaking process in pure distilled water (water containing salts of lime or organic substances should be avoided, as the first tend to harden or combine with the resins and oils in the hops, and the others are offensive). The proportion of water to the hops should be approximately seven to ten liters of water to each kilo of hops, according to the age and condition of the latter, and the soaking process should be continued for a period sufficiently long to thoroughly saturate the hops, at a temperature safely below that of fermentation and preferably approximating 16° C., for a period in practice often found to be from 8 to 100 hours. By osmotic action during this soaking process the lupulin cells of the hops are filled to their utmost capacity, in consequence of which, when the temperature of the hops and liquor is raised during the subsequent digestion, these cells are all burst and give up the whole of their contents. If the cells do not burst and thus give up the whole of their contents, a large quantity of the resins will not be converted during the digestion into valuable products. That these resins are extracted and are converted into valuable products for use in the extract in the manufacture of beer, I have proved by an exhaustive series of analyses. It is to be understood, therefore, that this prolonged soaking of the hops to the point of satura- tion has a special and important purpose other than the mere expelling of air from the hops, which is the usual purpose of maceration heretofore employed.

After the soaking process is completed, heat is applied to the bottom of the digester 1, whereby the water collected under the plate 2 is forced by pressure of steam through the pipe 3, and in striking against the baffle plate 5, is distributed over the perforated plate 4, and after percolating through the body of the hops returns to the heating compartment below the plate 2. Thus, in effect, a continuous leaching process is secured.

The temperature during the process of boiling should never exceed 101° C. and should be maintained as nearly uniform as possible, in order to keep a continuous stream of water percolating through the hops.

In order to extract the entire content of the hops, excepting some of the coarser resins, which are never used in the manufacture of beer, the process should be continued for sufficient time, from six to eighteen hours, to soften the resinous portion of the hops, according to the age and condition of the hops. Experiment with a given sample of the hops to be digested will indicate the best time during which the digesting process should be continued, taking into consideration the kind of beer to be desired—for instance, if a light mild beer is desired, the process should be relatively short as compared with the time necessary to make a strong bitter beer. In fact, an extract may be prepared by my process which will be adapted for any quality of beer desired, in so far as it owes its quality to the hops.

The safety valve 9 should be set at a pressure of from one to three kilos during the entire process of boiling, so as not to act after the expanded air within the digester is thrown off. This is an extremely important requirement, inasmuch as otherwise the flavor and fragrance of the hops will be thrown off with the steam. The mass should then be cooled by any suitable apparatus, such as a system of cold water pipes in the digester, as rapidly as possible to approximately 50° C., to avoid the formation of acetic acid, or any other product of fermentation. The liquid should then be immediately extracted from the mass of hops by means, for example, of a centrifugal machine, such as is used in sugar making, or by pressure. If the liquid is allowed to stand, even for a short time, at above the temperature of fermentation, fermentation will begin with the accompaniment of acetic acid and other products of fermentation, which would vitiate, if not ruin, the entire result. The liquid should then be immediately evaporated by placing the same in a suitable vacuum pan, such, for example, as is used in sugar making, and a vacuum maintained at not less than 67 cm. The temperature at which evaporation may be secured should be below that at which volatilization of the essential oils and ethers or lighter hydrocarbons would take place. In any event, the temperature should not rise above 60° C. In practice, a temperature should be maintained at say 54° C., and the vacuum at from 73 to 74 cm.

To recapitulate, the entire process consists in the aqueous extraction of the required properties of the hops by soaking the hops to saturation, digesting the mass in a sealed boiler at a temperature not exceeding 101° C. for from six to eighteen hours determined by the age and condition of the hops, immediate extraction from the hops and then the evaporation of the water of digestion at a temperature of about 54° C., but never exceeding 60° C., whereby only such content of the hops is extracted as is essential to the manufacture of beer of a given quality, and all content, foreign or deleterious thereto, is eliminated. The reason for maintaining the temperature specified is that the ethers and essential oils contained in the hops which constitute the fragrances and flavors of the proper extract, are most volatile. At a temperature above 60° C. all the more valuable essential oils and fragrances volatilize and are lost. In practice the vacuum caused by the condensation of the steam or vapor in the process of evaporation is not sufficient for evaporation at the necessary temperatures for making hop extract. It is, therefore, necessary to employ an auxiliary vacuum agent, for example, a mercurial pump.

In order to produce hop extracts adapted for the manufacture of beer of different qualities, the periods of time and the temperatures above mentioned may be varied within the limits specified, as experience will suggest.

What I claim is:

1. The process of extracting from hops the substance used in the manufacture of beer, which consists in soaking the entire hops to the point of saturation in pure water, then digesting the mass in a sealed vessel at a temperature sufficiently high to burst the cells, but not exceeding 101° C., rapidly cooling the mass below the point of fermentation, immediately withdrawing the liquor from the hops, and immediately evaporating said liquor in a vacuum sufficiently high to evaporate the water at a temperature below that at which the essential oils and other volatile constituents will volatilize.

2. The process of extracting from hops the substance used in the manufacture of beer, which consists in soaking the entire hops to the point of saturation in pure water, then digesting the mass at a temperature sufficiently high to burst the cells, but not exceeding 101° C., for a period of from 6 to 18 hours, according to the age and condition of the hops to soften the more soluble resins therein, immediately cooling the mass to a temperature below the point of fermentation and immediately extracting the liquor of digestion, and evaporating said liquor in a vacuum at a temperature not exceeding 60° C.

GEORGE GREGORY SMITH.

Witnesses:
RALPH C. POWELL,
CHAS. A. PEARD.

Copies of this patent may be obtained for five cents each, by addressing the "Commissioner of Patents, Washington, D. C."